Sept. 16, 1947.    A. McL. NICOLSON    2,427,569
WAVE SENSITIVE AND WAVE FRONT DETECTING APPARATUS
Filed April 20, 1943    3 Sheets-Sheet 1
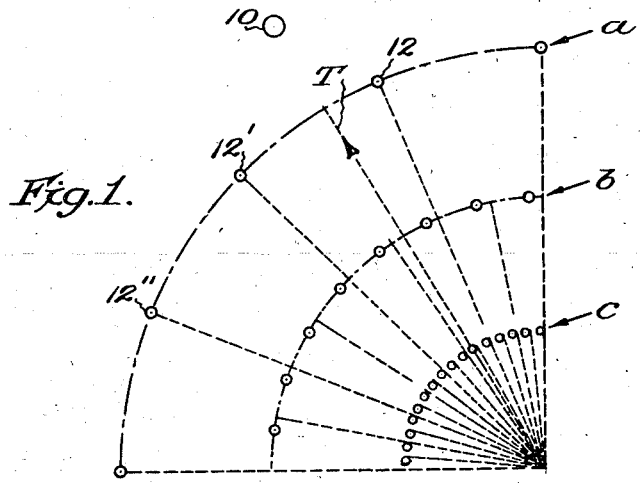
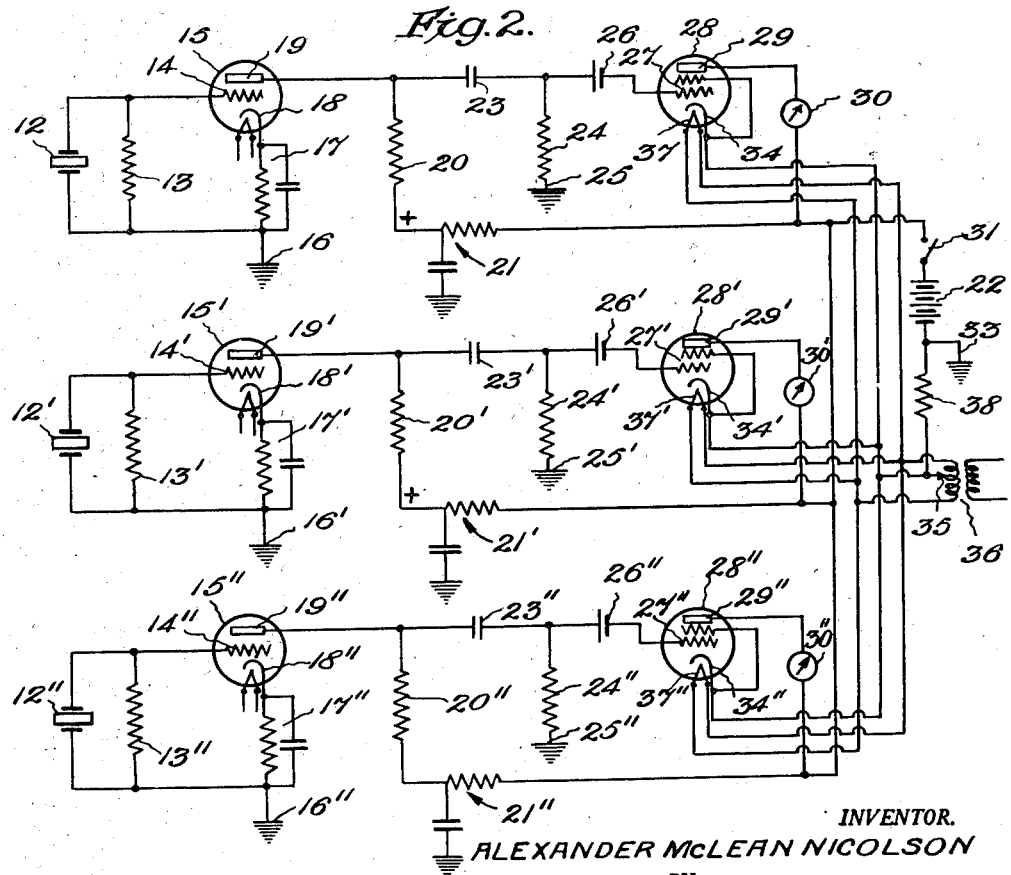
INVENTOR.
ALEXANDER McLEAN NICOLSON
BY
*Hoquet, Neary & Campbell*
ATTORNEYS Sept. 16, 1947.  A. McL. NICOLSON  2,427,569
WAVE SENSITIVE AND WAVE FRONT DETECTING APPARATUS
Filed April 20, 1943  3 Sheets-Sheet 2

INVENTOR.
ALEXANDER McLEAN NICOLSON
BY
Hoguet, Neary & Campbell
ATTORNEYS

Sept. 16, 1947.  A. McL. NICOLSON  2,427,569
WAVE SENSITIVE AND WAVE FRONT DETECTING APPARATUS
Filed April 20, 1943   3 Sheets-Sheet 3
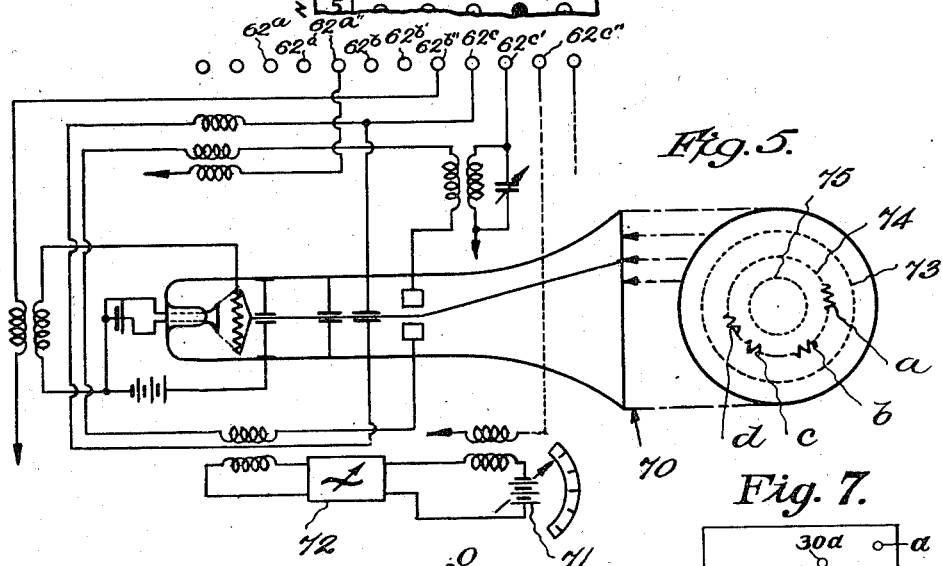
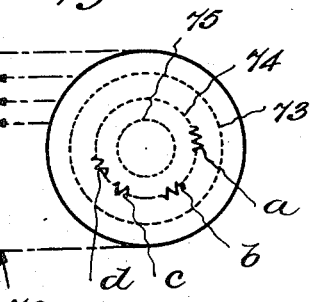
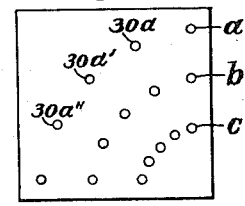
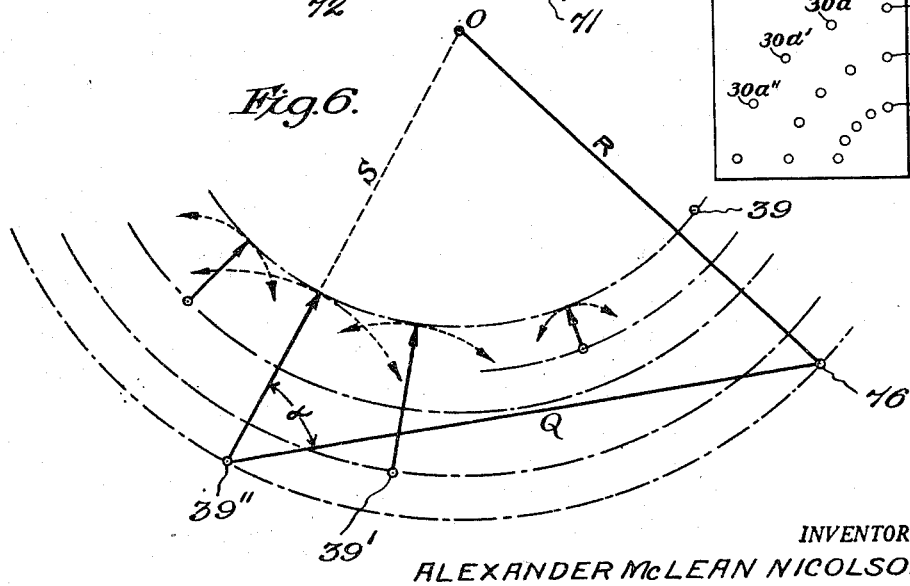
INVENTOR.
ALEXANDER McLEAN NICOLSON
BY
Hoguet, Neary & Campbell
ATTORNEYS Patented Sept. 16, 1947

2,427,569

UNITED STATES PATENT OFFICE 2,427,569

WAVE SENSITIVE AND WAVE FRONT DETECTING APPARATUS

Alexander McLean Nicolson, New York, N. Y.

Application April 20, 1943, Serial No. 483,723

7 Claims. (Cl. 177—352)

1

This invention relates to methods and devices for determining the direction and distance of wave sources and relates particularly to methods and devices for sound ranging and distance measuring, an art that I term "wavemetry."

This application is a continuation-in-part of my copending application for Wave sensitive and wave front detecting devices, filed December 16, 1938, Serial No. 246,130.

An object of the invention is to provide methods and devices for determining the direction and distance of a wave source or of an object capable of reflecting waves.

Another object of the invention is to provide devices having a plurality of detecting elements which selectively cooperate to establish the position of a wave source by allowing only the detector first energized by an advancing wave front to give a characteristic signal whereby the direction of the source is established.

A further object of the invention is to provide devices whereby the distance of a wave source of vibration such as an explosive, for example, can be measured and its direction determined, and whereby effective sound ranging can be accomplished.

Other objects will become apparent from the description of typical embodiments of the invention hereinafter described.

According to the invention, means are provided for indicating the order of arrival of a wave front from an unknown source at a plurality of wave energy detectors located at known positions in operative relationship to the medium through which the wave front is propagated. Knowing the positions of the detectors in space and the order in which the wave front arrives at the detectors, the direction of propagation of the wave front and thus the direction of the source can be readily ascertained. The distance of the source can then be deduced by noting the times that elapse between the arrival of the wave front at the respective detectors.

In a further embodiment, the detectors are located in rows and are so interconnected that the first detector energized in each row acts to suppress all the other detectors in the same row so that only one detector in each row is energized by a passing wave front. By observing which of the detectors were energized, the direction of the source from which the wave front was propagated can readily be determined.

The detectors are of various types capable of response to the arrival of wave fronts having wave lengths varying from short radio waves to waves having audible frequencies. For example, piezoelectric crystals, photoelectric cells and radio receivers may be used depending on the frequency or slope of the wave that is to be measured.

Devices embodying the invention may be applied to gun ranging, and any type of explosive discharge, such as the firing of a projectile, torpedo or mine, for example, may be located by means of a group of detectors that instantly indicate their sequence of detection, thus determining the direction from which the wave front advances and the position of the discharge.

For a better understanding of the invention, reference may be had to the accompanying drawings in which:

Figure 1 is a schematic diagram showing a plurality of detectors arranged in a simple geometric configuration for gun ranging purposes;

Figure 2 is a schematic diagram of an electrical circuit constructed according to the invention for conducting gun ranging operations with the detector configuration shown in Figure 1;

Figure 4 is a diagrammatic showing of an annunciator panel for the device shown in Figure 3;

Figure 5 illustrates schematically a circuit, including a cathode ray chronoscope for determining intervals of time;

Figure 6 represents diagrammatically the manner in which the direction and distance of a source may be determined in accordance with the invention;

Figure 7 is a view of a panel board for use with the embodiment illustrated in Figures 1 and 2.

Figure 3:
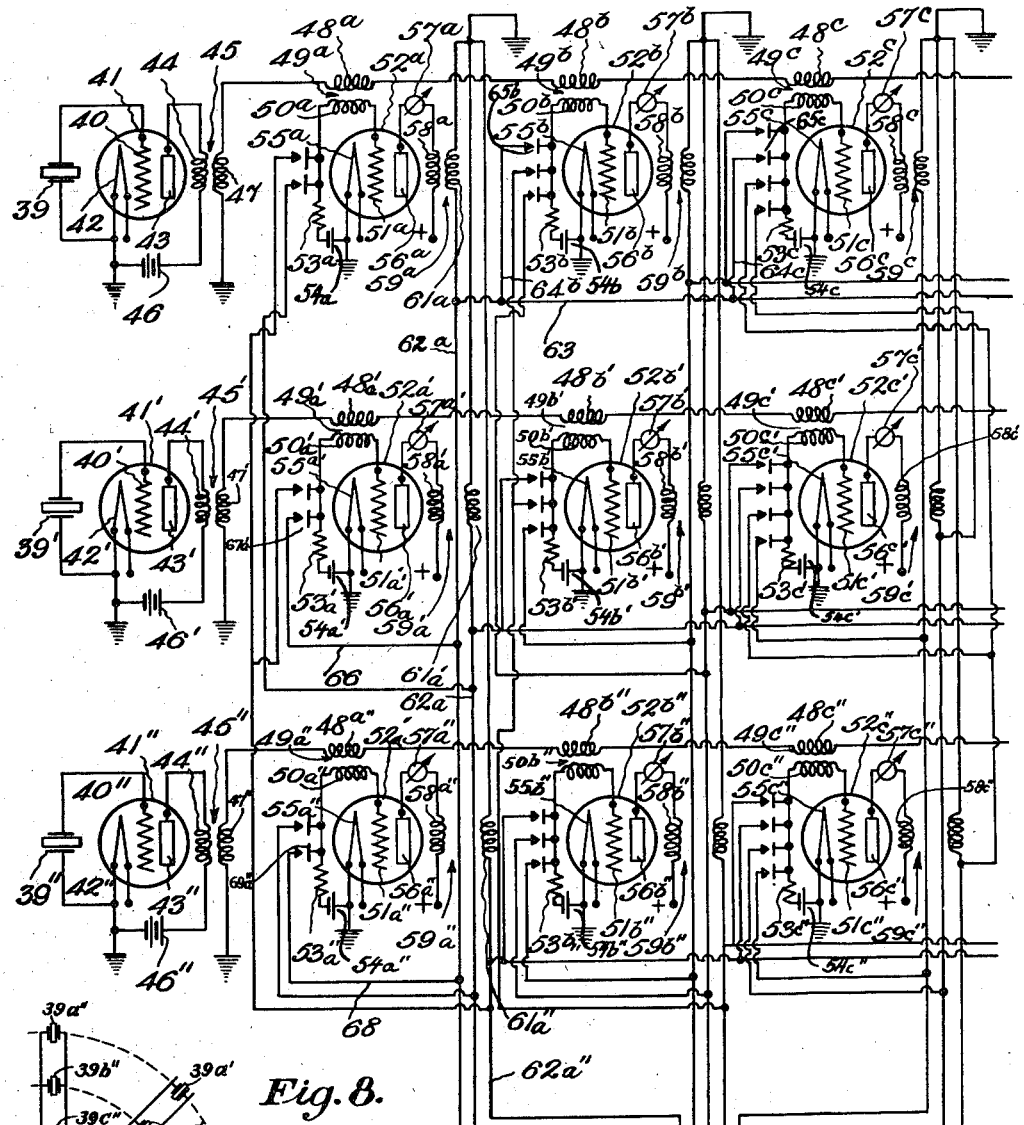
Figure 3 is a schematic diagram of a modified form of circuit for use in gun ranging operations.

The invention is shown in Figure 1 as applied to the location of the direction and distance of the source of a wave front generated in any known fashion, as, for example, by an explosion or from firing a gun or percussive charge on land, sea, etc.

The apparatus for determining the direction of the source of wave energy comprises a plurality of detectors distributed in known spatial relation. While the detectors may be distributed in any desired manner, it will be assumed in the following description that they are located in arcuate rows $a$, $b$, and $c$, as shown. The detectors are so interconnected with one another that the first one to be energized by the arrival of a wave front from the unknown source 10 will signal the arrival of the wave front and, at the same time, will simultaneously suppress all of the other detectors in the same row. Thus, when a wave front from the source 10 passes the array of detectors, only one detector in each of the rows $a$, $b$, and $c$ will indicate the arrival of a wave front. From the position of the energized detectors, the direction of the unknown source 10 can readily be deduced.

Since the detectors are identical and the interconnection of the detectors in any one row is the same as the interconnection of the detectors in the other rows, it will be necessary only to describe in detail only several detectors in one row, with their circuit connections, as shown in Figure 2.

Referring to Figure 2, the wave energy detectors are shown as conventional type piezoelectric crystals 12, 12' and 12", for example, which may be coupled in any conventional manner to the medium through which the wave energy is being propagated. Since the electrical circuits in which the crystals 12, 12' and 12" are connected are substantially identical, it will be necessary only to describe one, corresponding parts in the other two being designated by primed and double primed reference characters, respectively.

The crystal 12 is connected in parallel with a grid leak 13, one terminal of which is connected to the control grid 14 of a conventional type electronic amplifying tube 15 and the other terminal of which is grounded at the point 16. Bias for the tube 15 is provided by a conventional type resistor-condenser combination 17 connected in series with the cathode 18 of the tube 15. The plate electrode 19 of the tube 15 is connected in series with a plate resistor 20 and through a conventional resistance-condenser filter 21 and a switch 31 to the positive terminal of a source of direct current 22, the negative terminal of which is connected to ground at 33.

Any alternating voltage which is developed across the plate resistor 20 when the crystal 12 is energized is transmitted through a blocking condenser 23 and is impressed upon a grid leak 24. One end of the grid leak 24 is grounded at the point 25 and the other end is connected in series with a source of negative biasing voltage 26 to the control grid 27 of a conventional type gas tube 28 which may be type 2050 or 2051, for example. The plate electrode 29 of the tube 28 is connected in series with a conventional type indicating instrument 30 which, in turn, is connected through the switch 31 to the positive terminal of the source of direct current 22. The cathodes 34, 34' and 34" of the tubes 28, 28' and 28" are connected to the mid-tap 35 of a transformer 36 which supplies electrical energy to the filaments 37, 37' and 37" of the tubes 28, 28' and 28", respectively. The mid-tap 35 of the transformer 36 is also connected in series with a biasing resistor 38 to the ground point 33.

In operation, let it be assumed that the crystals 12, 12' and 12" correspond to three adjacent detectors in row $a$ of Figure 1. If the wave front propagated from the source 10 reaches the crystal 12 before it reaches the crystals 12' and 12", a voltage will be impressed upon the control grid 14 of the tube 15 and the amplified output of the tube 15 will be impressed upon the control grid 27 of the gas tube 28, rendering the latter conducting and operating the indicator 30.

It will be noted that the passage of current through the resistor 38 when the tube 28 is rendered conducting will reduce appreciably the voltage applied to the plate electrodes 29' and 29" of the tubes 28' and 28". Also, the voltage drop across the resistor 38 applies additional negative bias to the grids 27' and 27" of the tubes 28' and 28", thereby rendering the latter inoperative to respond to the wave front when it eventually reaches the crystals 12' and 12".

It will be apparent from the foregoing, that by connecting the detectors in each of the tiers $a$, $b$ and $c$ as indicated in Figure 2, the arrival of the wave front at one detector in any tier will automatically suppress the other detectors in the same tier, rendering them inoperative to signal the arrival of the wave front. By noting which of the detectors was energized by a wave front, the direction of the unknown source 10 can be readily ascertained. The making of such determinations can be facilitated by substituting electric lamps 30$a$, 30$a'$, 30$a''$, etc., for the indicators 30, 30' and 30", etc., and mounting them on a panel board in the same spatial relationship as the detectors shown in Figure 1 as illustrated in Figure 7.

After one detector has been actuated in each of the tiers $a$, $b$ and $c$ and the direction of the unknown source has been determined, the system can be restored to its initial condition by opening the switch 31 for the circuits in each tier. When the switches 31 are again closed, the system is made ready for another direction determination.

If desired, a wireless interconnecting selector system, similar to that shown in my above mentioned copending application Serial No. 246,130, may be employed with the detectors shown in Figure 1. In such case, the detector first energized in any tier will indicate the arrival of a wave front and will send out a radio signal which will prevent any other detector in the same tier from responding to the wave front.

A modified form of direction finding device is disclosed in Figures 3 and 4. This device is provided with a plurality of detectors that are actuated by an advancing wave front and are so associated that the advent of the wave front at each detector is determined and indicated in the order in which it reaches the detectors. Thus, instead of the wave front actuating the indicator of the first detector reached and causing suppression of the remaining detectors, this form of device causes each detector to actuate an indicator which discloses the order in which the detectors are actuated.

Any number of detectors may be employed, and they may be distributed in random fashion or in any desired geometric configuration. However, for the sake of simplicity, only three detectors and their associated circuits are shown in Figure 3. As shown in Figure 3, the detectors may be piezo-electric crystals 39, 39' and 39", respectively, which may be coupled in any desired manner to the medium through which the wave energy is being propagated. Since the circuits associated with the crystals 39, 39' and 39" are substantially identical, it will be necessary to describe only one in detail, corresponding parts in the other two being designated by primed and double primed reference characters, respectively. Since certain elements in these circuits are also disposed in vertical columns, corresponding elements in the vertical columns will be further designated by the subscripts $a$, $b$ and $c$, respectively.

The crystal 39 is connected at one end to the control grid 40 of an electronic amplifying tube 41 and to the grounded end of the filament 42 thereof. The plate electrode 43 of the tube 41 is connected in series with the primary winding 44 of a conventional type transformer 45 to the positive terminal of a source of direct current electrical energy 46, the negative terminal of which is connected to ground. The secondary winding 47 of the transformer 45 is connected at one end to ground, and its other end in series with the primary windings 48a, 48b and 48c of the transformers 49a, 49b and 49c, respectively.

The secondary winding 50a of the transformer 49a is connected at one end to the control grid 51a of a conventional electronic amplifying tube 52a and at its other end in series with a resistor 53a and a source of grid biasing voltage 54a to the grounded end of the filament 55a. The plate electrode 56a of the tube 52a is connected in series with a conventional type indicator 57a, and the primary winding 58a of a conventional type transformer 59a to the positive terminal of a source of plate voltage, the negative terminal of which is connected to ground. Similar connections and circuits are provided for the transformer windings 48b and 48c and are indicated by the subscripts b and c, respectively.

The transformer 59a is provided with a secondary winding 61a, one end of which is connected to ground and the other end of which is connected to a conductor 62a. From the conductor 62a extends a conductor 63 which is connected, in turn, by conductors 64b and 64c to conventional type rectifiers 65b and 65c, the other terminals of which are connected between the resistor 53b and the secondary winding 50b and between the resistor 53c and the secondary winding 50c, respectively. Similarly, the conductor 62a is connected by means of a conductor 66 to conventional type rectifying means 67a', the other terminal of which is connected between the resistor 53a' and the secondary winding 50a'. The conductor 62a is also connected by a conductor 68 to conventional rectifying means 69a", the other end of which is connected between the resistor 53a" and the secondary winding 50a".

In similar fashion, the secondary winding 61a' is connected to a conductor 62a' which supplies biasing voltage for suppressing the tubes in the first column and second row. The secondary winding 61a" is connected in series with a conductor 62a" which supplies biasing voltage for suppressing the tubes in the first column and last row. Analogous connections are provided, as shown, for suppressing the tubes in any row and column in which an actuated tube may be located.

In operation, let it be assumed that a wave front from an unknown source arrives at the crystal 39 before it reaches the crystals 39' and 39". The voltage generated by the crystal 39 upon the arrival of the wave front will be amplified by the tube 41 and will be impressed first upon the control grid 51a of the tube 52a thereby operating the indicator 57a in the plate circuit thereof and impressing a voltage upon the secondary winding 61a of the transformer 59a. The voltage impressed upon the secondary winding 61a is supplied to the rectifying means 65b and 65c and biases the grid elements 51b and 51c of the tubes 52b and 52c negatively, thereby preventing their indicators 57b and 57c from responding. At the same time, voltage from the secondary winding 61a is impressed upon the rectifying means 67a' and 69a" thereby biasing the tubes 52a' and 52a" negatively and preventing their indicators 57a' and 57a" from responding.

When the wave front reaches the crystal 39', the tubes in the first column and first row will still be inoperative and only the indicator 57b' in the plate circuit of the tube 52b' will be actuated. At the same time, the tubes in the second column and second row will also be rendered inoperative so that when the wave front eventually arrives at the crystal 39", only the tube 52c" can respond.

Thus, if a wave front strikes the crystals 39, 39' and 39" in that order, the indicators 57a, 57b' and 57c" will respond in that order, enabling an observer to determine the order of arrival of a wave front at the detectors. If desired, lamps may be used for the detectors 57 and they may be mounted on a panel board as shown in Figure 4. Where this is done, the direction of an unknown source may be quickly and easily determined.

Figure 8:
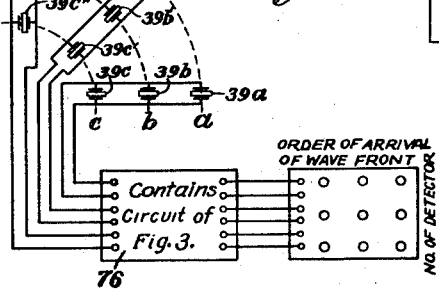
Figure 8 illustrates schematically a further modification of the embodiment illustrated in Figure 3.

As a further modification, the circuit shown in Figure 3 may be used with a configuration of detectors of the type shown in Figure 1. In such case, an equal number of detectors should be provided in each row, and each detector in each row should be connected in parallel with the corresponding detectors in the other rows. Thus, in Figure 8, the detectors 39a, 39a' and 39a" are connected in parallel to the detectors 39b, 39b' and 39b" and 39c, 39c' and 39c", respectively, and to a circuit 76 of the type illustrated in Figure 3, which is connected to a panel board of the type shown in Figure 4. If the spacing between the rows of detectors is greater than the duration of the wave propagated by the source the panel board may be employed to indicate the order of arrival of the wave front at each detector in each row of detectors.

In order to determine the distance of the unknown source of propagation of the wave front from a point of observation, it is necessary to determine the time elapsed between the arrival of the wave front at one detector and its arrival in succession at several adjacent detectors. These time intervals may be determined by means of the apparatus shown in Figure 5 of the drawings.

Referring now to Figure 5, a cathode ray oscilloscope 70 is shown, on the the face of which is generated a circular trace. To this end, the circuit is connected essentially as shown in my prior Patent No. 1,470,696, dated October 16, 1923, and entitled Television. By adjusting the source of voltage 71 for the oscillator 72 which supplies alternating current to the deflecting plates of the oscilloscope 70, the radius of the circular trace generated on the face of the oscilloscope 70, and hence its velocity, may be controlled as desired. Thus, traces 73, 74 and 75 of different radii may be produced by proper adjustment of the source of voltage 71. If desired, a spiral trace may be used instead of the circular trace described above. This may be obtained as described in my above mentioned Patent No. 1,470,696 or in any other suitable manner.

By connecting the conductors 62a, 62a', 62a", 62b, 62b', 62b", 62c, 62c' and 62c" in Figure 3 to the correspondingly numbered terminals in Figure 5, characteristic deflections a, b, c, d may be formed in the circular trace each time one of the indicators 57 is actuated. As is known in the art, the time elapsed between the actuation of the respective indicators 57 may be determined by measuring the length of the trace on the oscilloscope between the characteristic indications produced by the indicators 57. If desired, a permanent record of the trace may be made as by photography, for example.

In order more completely to identify the respective signalling stations depicted on the screen of the oscilloscope 70, it is convenient to permit tell-tale peculiarities of the individual detectors to make their mark, especially for recording purposes. The signals produced by the detectors may be differentiated by causing the trace deflection corresponding thereto to have a different appearance, as by controlling the frequency, slope, intensity, sign, retardation or acceleration, damping, or number of oscillations. Thus, the signal from the terminal 62b'' (Fig. 5) is injected into the control grid circuit of the cathode ray tube 70, in such fashion that it causes a momentary increase or decrease in the intensity of the cathode ray beam. Similarly, the signals from the terminals 62a'' and 62c are impressed upon the vertical and horizontal deflecting plates, respectively, of the oscilloscope 70, producing characteristically sloping curves on the screen thereof. The different trace deflections, accordingly, correspond to the differently positioned detectors which they represent.

Assuming that the point O in Figure 6 is the location of the source of disturbance, such as the discharge of a field gun, a wave front of generally circular shape will advance outwardly from O. In the path of the wave front are disposed a plurality of detectors such as 39, 39' and 39'', for example, which may be connected as shown in Figure 3. The detectors may be located at random or in any desired geometrical configuration. The source O may be located, in accordance with the invention, by locating three or more points, not in line, which define a circle and its center.

From the cathode ray oscilloscope 70, the time intervals elapsing between the arrival of the wave front at the respective detectors 39, 39', 39'', etc., are determined. The positions of the detecting stations are marked on the chart shown in Figure 6. Since the velocity of the wave front is known, the distance traveled by it in the time elapsing between the arrival of the wave front at any two successively energized detectors can be readily ascertained.

For convenience, time will be measured from the instant the wave front arrives at one of the detectors, say the detector 39 (Fig. 6). The times elapsed while the wave front travels to the detectors 39', 39'', etc., are then determined and the distances traveled by the wave front in those times are computed. When this has been done, a circle is drawn with the position 39' as center and of radius equal to the distance traveled by the wave front during the time elapsed between its arrival at the detector 39 and the detector 39'. Similar circles are drawn with the respective detector positions as centers and of radii equal to the distance traveled by the wave front in the time elapsed between its arrival at the detector 39 and the respective detectors forming the centers of the circles.

As shown in Figure 6, all circles thus drawn lie upon part of a circle whose center is at O, the location of the unknown source. The center O can be readily determined by construction and the distance R to any observation position 76 found either by construction or from the relation:

$$R = \tfrac{1}{2} Q \sec \alpha$$

where R and S are radii subtending the base line Q and equal to the distance to the source O. The angle $\alpha$ is defined as a base-line angle of any directive normal to the wave front which has been discovered by the oscilloscope or the dial panel.

It may be desirable to calibrate the system before making a determination by firing one or more check shots at known locations, and determining their locations as described above.

Means automatic for implementing both distance and direction finding apparatus above described are obviously available because, for example, the form of device disclosed in Figure 1 directly shows the direction of wave front source as a line of visible indication passing through the origin of the wave source. Were this line to be illumined, as indicated by the broken line T, a definite visual indication of the direction of the wave source would be established. By means of light responsive devices which may further be implemented by current relays, apparatus like searchlight directing, gun pointing and firing devices and the like may be manipulated.

It will be apparent from the foregoing that the invention provides a new and improved means for determining the direction and distance of an unknown source of wave energy from a given point of observation.

While several specific embodiments have been described above, the invention is not intended to be limited thereto. Those embodiments are susceptible of numerous changes in form and detail within the scope of the following claims.

I claim:

1. A method for determining the direction of a source of wave energy comprising, disposing a plurality of groups of wave energy detectors in the path of a wave front generated by said source, said groups being arranged in such relation that an advancing wave front passes said groups in succession, providing a sensible indication when said wave front reaches the first detector in each of said groups, and rendering all the detectors in each group, except the one first to receive said wave front, inoperative to respond to the arrival of a wave front.

2. Apparatus for determining the direction of a source of wave energy comprising, a plurality of wave energy detectors disposed in the path of a wave front generated by said source, a plurality of indicating means for each of said wave energy detectors equal in number to the number of detectors and corresponding to the possible orders of arrival of the wave front at the detector corresponding thereto, and electrical means connected to said detectors and indicating means for operating one of said indicating means for each detector, upon the arrival of the wave front at said detector, in accordance with the order of arrival of the wave front at said detector.

3. Apparatus for determining the direction of a source of wave energy comprising a plurality of groups of detectors, said groups being arranged in substantially parallel rows and disposed in the path of a wave front generated by said source, indicating means for each of said detectors, and electrical means connected to the detectors in one of said groups, and rendered operative by the first detector in said group to receive the wave front, for rendering the other detectors in said group inoperative to respond to said wave front thereafter.

4. In a device for determining the sequence of reception of signals and the direction of a wave source, the combination of a plurality of groups of devices for detecting the arrival of an advancing wave front, said groups and each of the devices in said groups being located so that an advancing wave front passes said groups and each of the devices in said groups in succession, a separate signalling means associated with and actuated by each device, rectifying means associated with each device for supplying biasing potentials to the other devices of the same group to suppress actuation of the signalling means of each group except the device first energized by an advancing wave front, and means supporting said signalling means in the same relative positions as said detecting devices, whereby upon actuation of a signalling means by one of each group of detecting devices, the direction of the wave source may be determined.

5. In a device for determining the direction and distance of a wave source, the combination of a plurality of groups of devices of known location for detecting the arrival of a wave front generated by said wave source, said groups being disposed in spaced apart relation so that an advancing wave front passes said groups successively, means associated with each device for supplying a biasing potential to the other devices of the same group to render said other devices inoperative upon one device first detecting the arrival of said wave front, and signalling means associated with each device of each group for signalling the advent of the wave front at said one device of each group whereby the intervals between the successive advents of the wave front at said one device of each group may be determined.

6. In a device for determining the location of a wave source, the combination of a plurality of wave detecting means, a plurality of indicating devices equal in number to the square of the number of detecting means arranged in horizontal and vertical columns on a supporting member, means electrically connecting each detector to a separate horizontal column of signalling devices, means electrically connecting the signalling devices in each vertical column, electrical means responsive to actuation of each detector by an advancing wave front for actuating one indicating device in the horizontal column to which the detector is connected, and means associated with the detecting means for suppressing operation of other indicating means in the same horizontal and vertical columns.

7. In a device for determining the location of a wave source, the combination of a plurality of wave-detecting means disposed in a plurality of substantially parallel rows each containing equal numbers of wave-detecting means, the spacing between said rows being substantially greater than the duration of the wave emitted by said source, electrical means connecting the wave-detecting means in each row in parallel with the corresponding wave-detecting means in the other rows, a plurality of indicating devices equal in number to the square of the number of detecting means in one row, said indicating devices being arranged in horizontal and vertical columns on a supporting member, means electrically connecting each wave-detecting means in one of said rows to a separate horizontal column of indicating devices, means electrically connecting the indicating devices in each vertical column, electrical means responsive to actuation of each detector by an advancing wave front for actuating one indicating device in the horizontal column to which the detector is connected, and means associated with the detecting means for suppressing operation of other indicating devices in the same horizontal and vertical columns.

ALEXANDER McLEAN NICOLSON.

REFERENCES CITED

The following references are of record in the file of this patent:

UNITED STATES PATENTS

| Number | Name | Date |
| --- | --- | --- |
| 2,007,211 | Nicolson | July 9, 1935 |
| 1,149,976 | Furber | Aug. 10, 1915 |
| 2,033,135 | Fay et al. | Mar. 10, 1936 |
| 1,983,254 | Turner | Dec. 4, 1934 |
| 2,304,965 | Sproule | Dec. 15, 1942 |

FOREIGN PATENTS

| Number | Country | Date |
| --- | --- | --- |
| 473,067 | Great Britain | Oct. 6, 1937 |